United States Patent
Ott

(10) Patent No.: US 10,953,495 B2
(45) Date of Patent: Mar. 23, 2021

(54) BUILDING PLATFORM FOR ADDITIVE MANUFACTURING, AND METHOD

(71) Applicant: Siemens Aktiengesellschaft, Munich (DE)

(72) Inventor: Michael Ott, Mülheim an der Ruhr (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 224 days.

(21) Appl. No.: 16/093,302

(22) PCT Filed: Apr. 19, 2017

(86) PCT No.: PCT/EP2017/059222
§ 371 (c)(1),
(2) Date: Oct. 12, 2018

(87) PCT Pub. No.: WO2017/194275
PCT Pub. Date: Nov. 16, 2017

(65) Prior Publication Data
US 2019/0134749 A1    May 9, 2019

(30) Foreign Application Priority Data

May 9, 2016   (DE) ..................... 10 2016 207 893.3

(51) Int. Cl.
*B23K 26/342*   (2014.01)
*B33Y 30/00*   (2015.01)
(Continued)

(52) U.S. Cl.
CPC .......... *B23K 26/342* (2015.10); *B22F 3/1055* (2013.01); *B23K 26/0006* (2013.01);
(Continued)

(58) Field of Classification Search
CPC .............. B23K 26/342; B23K 26/0006; B23K 26/1464; B23K 2103/26; B23K 2101/001;
(Continued)

(56) References Cited

U.S. PATENT DOCUMENTS 8,691,333 B2 *  4/2014  Godfrey ................ B22F 3/1055
                                                    427/189
9,447,484 B2 *  9/2016  Kington ................ B22F 3/1055
(Continued)

FOREIGN PATENT DOCUMENTS

| DE | 102011108957 A1 | 1/2013 |
| DE | 102013218760 A1 | 3/2015 |
| EP | 2359964 A1 | 8/2011 |

OTHER PUBLICATIONS

International search report and written opinion dated Aug. 9, 2017, for corresponding PCT/EP2017/059222.

*Primary Examiner* — Phuong T Nguyen

(57) ABSTRACT

A construction platform for the additive manufacturing of a component, in particular from a superalloy, wherein the construction platform has a surface region that is produced by an additive manufacturing method, wherein the additive manufacturing method is a beam melting or beam welding method. A construction platform is used as a substrate for the additive manufacturing of a component, in particular from a superalloy. A method includes the additive manufacturing of the construction platform, wherein a surface region of the construction platform is produced by a beam melting or beam welding method.

10 Claims, 1 Drawing Sheet

(51) Int. Cl.
*B33Y 10/00* (2015.01)
*B29C 64/153* (2017.01)
*B22F 3/105* (2006.01)
*B29C 64/00* (2017.01)
*B29C 64/245* (2017.01)
*B23K 26/00* (2014.01)
*B23K 26/14* (2014.01)
*B22F 5/04* (2006.01)
*B23K 103/18* (2006.01)
*B23K 101/00* (2006.01)

(52) U.S. Cl.
CPC .......... *B23K 26/1464* (2013.01); *B29C 64/00* (2017.08); *B29C 64/153* (2017.08); *B29C 64/245* (2017.08); *B33Y 10/00* (2014.12); *B33Y 30/00* (2014.12); *B22F 5/04* (2013.01); *B22F 2003/1056* (2013.01); *B22F 2999/00* (2013.01); *B23K 2101/001* (2018.08); *B23K 2103/26* (2018.08); *Y02P 10/25* (2015.11)

(58) Field of Classification Search
CPC ....... B33Y 10/00; B33Y 30/00; B29C 64/153; B29C 64/245; B29C 64/00; B22F 3/1055; B22F 5/04; B22F 2003/1056; B22F 2999/00

USPC .............................................. 219/76.1, 78.12
See application file for complete search history.

(56) References Cited

U.S. PATENT DOCUMENTS

| | | | |
|---|---|---|---|
| 9,556,525 B2 * | 1/2017 | Dierkes | A61K 6/818 |
| 9,604,409 B2 * | 3/2017 | Teulet | B33Y 10/00 |
| 2007/0126157 A1 | 6/2007 | Bredt | |
| 2012/0018115 A1 | 1/2012 | Hoevel et al. | |
| 2012/0237745 A1 * | 9/2012 | Dierkes | A61K 6/818 |
| | | | 428/215 |
| 2013/0004680 A1 | 1/2013 | Godfrey et al. | |
| 2013/0256953 A1 * | 10/2013 | Teulet | B22F 3/1055 |
| | | | 264/497 |
| 2014/0161601 A1 | 6/2014 | Geiger | |
| 2015/0093279 A1 * | 4/2015 | Kington | C22C 1/0491 |
| | | | 419/19 |
| 2016/0138516 A1 * | 5/2016 | Moding | C23C 16/406 |
| | | | 92/248 |
| 2016/0258045 A1 * | 9/2016 | Carter, Jr. | C22F 1/10 |

* cited by examiner

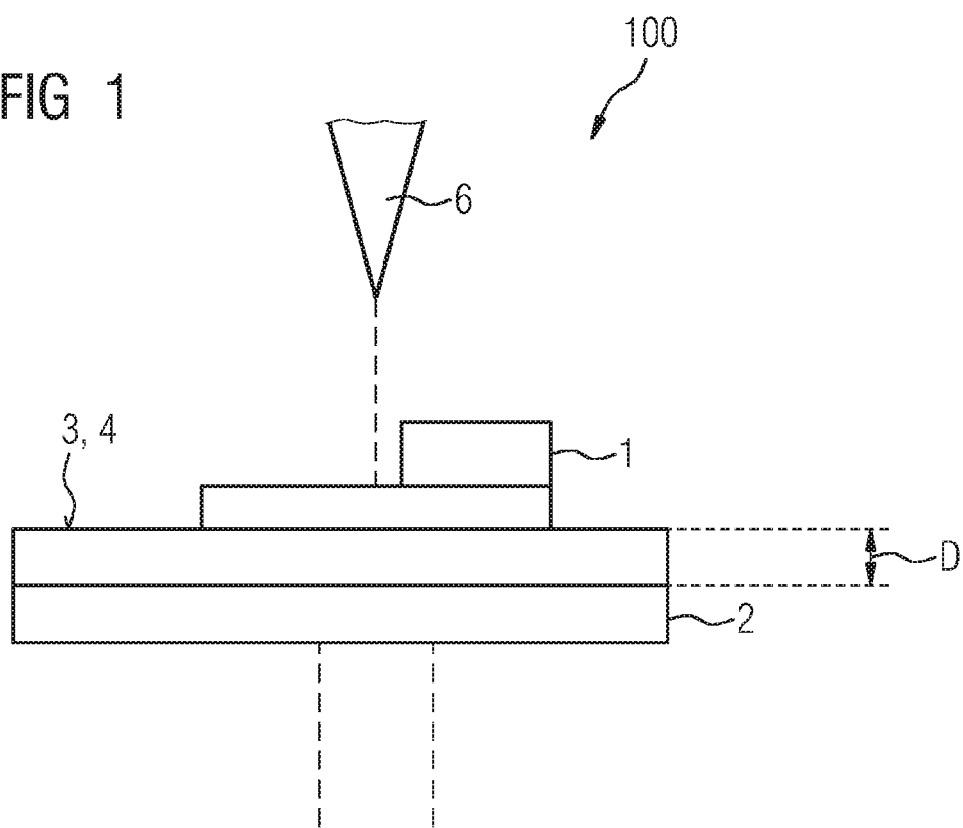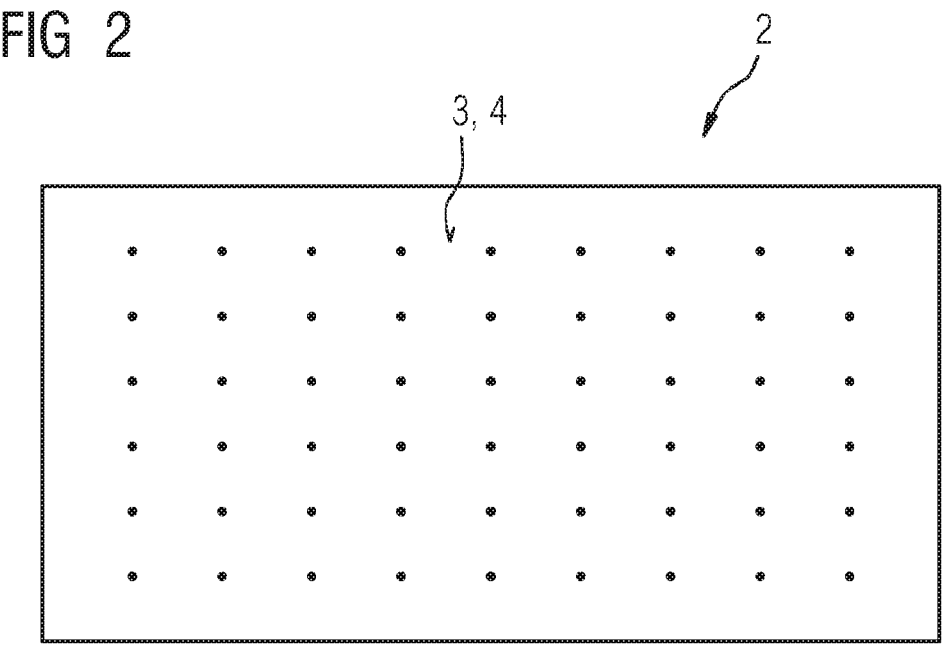

BUILDING PLATFORM FOR ADDITIVE MANUFACTURING, AND METHOD

CROSS REFERENCE TO RELATED APPLICATIONS

This application is the US National Stage of International Application No. PCT/EP2017/059222 filed Apr. 19, 2017, and claims the benefit thereof. The International Application claims the benefit of German Application No. DE 102016207893.3 filed May 9, 2016. All of the applications are incorporated by reference herein in their entirety.

FIELD OF INVENTION

The present invention relates to a building platform for the additive manufacturing of a component, to a corresponding system for additive manufacturing and to the use of the building platform as a substrate for additive manufacturing. Furthermore, the present invention relates to a method for the additive manufacturing of the building platform.

The component is advantageously provided for use in a turbomachine, advantageously a gas turbine. The component advantageously consists of a superalloy, in particular a nickel- or cobalt-based superalloy. The superalloy can be precipitation-hardened or precipitation-hardenable.

The component can furthermore consist of or comprise a scaling-resistant and/or high-heat-resistant alloy.

The component is advantageously used in a hot gas path or hot gas region of a turbomachine, such as a gas turbine.

BACKGROUND OF INVENTION

Generative or additive manufacturing methods comprise beam melting and/or beam welding methods, for example. The beam melting methods include, in particular, selective laser melting (SLM) or electron beam melting (EBM). The stated beam welding methods include, for example, electron beam welding or laser deposition welding (LMD), in particular laser powder deposition welding.

Additive fabrication or manufacturing methods have proved to be particularly advantageous for complex components or ones of complicated or delicate design, for example labyrinth-type structures, cooling structures and/or lightweight structures. In particular, additive manufacturing is advantageous, in particular through a particularly short chain of process steps, since a step of manufacturing or fabricating a component can occur directly on the basis of a corresponding CAD file.

Furthermore, additive fabrication is particularly advantageous for the development or production of prototypes which, for example for cost reasons, cannot be produced, or cannot be efficiently produced, by means of conventional subtractive or material-removing methods or casting technology.

A problem which is observed in the field of additive fabrication, in particular in the processing of high-performance materials by means of beam melting and/or beam welding methods, is that the formation or composition of a deposited material path or trace is dependent on the nature of the corresponding substrate. In particular, a penetration depth of a deposited welding trace (welding bead) can depend on the chemical and/or physical properties of the substrate material at the corresponding point.

Substrates for the described additive manufacturing methods are usually produced by means of fine casting technology. In the field of the additive fabrication of turbine parts, in particular from high-performance materials, such as superalloys, the corresponding substrate materials advantageously likewise comprise high-temperature-resistant or high-heat-resistant materials, for example superalloys.

However, the stated dependency of the deposition result on the substrate composition is particularly problematic in the processing of materials for turbine parts in which even very small traces or impurities can destroy the desired properties of the component to be additively manufactured or built up. For example, even small quantities of oxygen or other elements, which diffuse, for example, during the manufacture at an interface between the substrate and the component into said component, can prevent the formation of desired or required material phases, such as the $\gamma$ or $\gamma'$ phase of a nickel- or a cobalt-based superalloy.

The stated variation in the composition of the substrate can be production-related, and thus uncontrollable. In particular, with regard to the reproducibility of the manufacturing result, this constitutes a large hurdle which means an increased outlay on development and/or an increased cost and time expenditure, for example for finding parameters.

SUMMARY OF INVENTION

It is therefore an object of the present invention to specify means by which the stated problems can be solved. In particular, a component platform is specified which has, at least on a crucial surface region, a homogeneous composition with regard to its chemical and physical properties, with the result that, with the use of this component platform as a substrate, manufacturing results can be achieved in the additive manufacturing in a reproducible manner.

This object is achieved by the subject matter of the independent patent claims. Advantageous embodiments form the subject matter of the dependent patent claims.

One aspect of the present invention relates to a building platform for the additive manufacturing of a component, in particular from a superalloy, such as nickel- or cobalt-based, in particular high-heat-resistant alloy, for an application in a hot gas region of a gas turbine. The building platform has a surface region which is produced or built up or producible by an additive manufacturing method, wherein the additive manufacturing method is a beam melting or beam welding method. As an alternative, the additive manufacturing method can be a sintering method, for example selective laser sintering (SLS).

In particular, the provision of the building platform by the stated additive manufacturing methods and/or the corresponding materials offer—for example by contrast to substrates conventionally produced by fine casting—the advantage of a particularly homogeneous material composition. For example, the technology described means that it is possible for the surface of the substrate or the building platform to be built up almost completely as a single phase or without phase transitions. Consequently, the reproducibility of the manufacturing result is also improved by this "homogeneous substrate base". In particular, a homogeneous substrate surface or platform surface leads to reproducible results in the melt or in the material trace deposited directly on the substrate by welding processes.

The expression "composition" advantageously designates the chemical and/or physical composition.

The term "homogeneity" of the composition can be understood to mean that a corresponding material phase on a surface of the building platform which is advantageously formed by the surface region has only a single phase or is free of phase transitions which, for example by the fusion processes during the additive deposition of material on the substrate or the building platform, can also change the material structure deposited thereabove (see above).

For the solution of the problem described, it is sufficient according to the invention if only the described surface region is correspondingly homogeneous in its material properties, since the chemical/physical composition of the surface region is advantageously crucial for the material properties of the component to be built up on the building platform.

A further aspect of the present invention relates to a building platform, comprising the surface region which has, at least macroscopically, a chemically and/or physically homogeneous composition.

A further aspect of the present invention relates to a building platform, comprising the surface region which is, at least macroscopically, single-phase.

The expression "macroscopic" can mean in particular that a microscopic and/or mesoscopic homogeneity or "single-phase nature" does not also necessarily have to be present and, where appropriate, can even not be realized at all.

The stated homogeneity or single-phase nature advantageously relates to regions in the surface of the building platform with (lateral) dimensions of for example 100 µm and more.

The term "macroscopic" can further be understood to mean that the material composition varies for example only at a microscopic level, for example for dimensions of less than 100 µm, over the surface of the surface region.

For example, the material composition can—in order to be still homogeneous macroscopically—vary only over areas or dimensions which are no longer visible to the naked (human) eye.

In one embodiment, the additive manufacturing method is a method for laser or electron beam melting.

In one embodiment, the additive manufacturing method is a method for laser deposition welding, in particular for laser powder deposition welding.

In one embodiment, a method for the additive manufacturing of the component is a beam melting method, in particular selective laser melting. These methods are particularly expedient for the manufacture of turbine parts from high-performance materials according to a predetermined geometry.

In one embodiment, the method for the additive manufacturing of the component and the described additive manufacturing method for the building platform are identical. The use of the building platform as a substrate for the additive manufacturing of the component, wherein the building platform has been produced with the same method, is particularly advantageous since frequently similar or related material systems can be used by virtue of the methods of similar type, which systems lead to a particular reproducibility of the manufacturing result.

In one embodiment, the surface region consists of a superalloy, in particular a nickel- or a cobalt-based, precipitation-hardened or precipitation-hardenable superalloy or comprises said alloy.

In one embodiment, the surface region extends along a thickness of the building platform which is sufficient to ensure that variations in the material composition of the building platform below the surface region can no longer lead to changed properties of the component to be built up. This can in particular be the case since the described layer thickness or thickness can exceed a diffusion length of substances, which destroy the material properties of the component to be built up, in the substrate during the additive buildup.

In one embodiment, the surface region extends from a surface of the building platform to a thickness or depth of at least 500 µm, advantageously of at least 1 mm, into the building platform. In the present case, these layer thicknesses for the surface region are advantageously sufficient in order to achieve manufacturing results with regard to the material composition that are reproducible for structures for the component that are to be built up on the surface, in particular are to be connected in an integrally bonded manner.

In one embodiment, the building platform is produced or built up completely by the described additive manufacturing method. This embodiment is particularly advantageous in order to equip the entire building platform with an advantageously homogeneous material composition.

In one embodiment, the surface region has, at least macroscopically, a chemically and/or physically homogeneous composition.

In one embodiment, the surface region is, at least macroscopically, single-phase or the surface region does not have any eutectoid regions or phase transitions.

In one embodiment, the surface region has a particle distribution with an average particle size of less than 300 µm. In particular, the surface region has a particle distribution with an average particle size of less than 100 µm.

Furthermore, a relatively small particle distribution allows or advantageously gives rise to the desired homogeneity of the material composition or material properties of the surface region or of its surface.

A further aspect of the present invention relates to a system for the additive manufacturing of a component, comprising the building platform described. Furthermore, the system expediently comprises a device for beam melting and/or beam welding, for example of a starting material for the component.

A further aspect of the present invention relates to the use of the described building platform as a substrate for the additive manufacturing of the described component.

In one embodiment, at least a main and/or alloy constituent of a material of the surface region of the building platform corresponds with a main and/or alloy constituent of the component to be additively manufactured. This embodiment advantageously makes it possible for particularly reproducible results to be achieved during the additive manufacturing of the component.

A further aspect of the present invention relates to a method for the additive manufacturing of the described building platform for the additive manufacturing of a component (cf. above), wherein at least one surface region of the building platform is produced or can be produced by the beam melting or beam welding method (see above).

Embodiments, features and/or advantages which in the present case relate to the building platform or the system can also relate to the method for additive manufacturing or to the use, or vice versa.

BRIEF DESCRIPTION OF THE DRAWINGS

Further details of the invention will be described below with reference to the figures.

FIG. 1 schematically shows a sectional or side view of a system for the additive manufacturing of a component.

FIG. 2 shows a schematic plan view of a surface region of a building platform according to the invention.

DETAILED DESCRIPTION OF INVENTION

In the exemplary embodiments and figures, identical or identically acting elements can each be provided with the same reference signs. The elements illustrated and their mutual size ratios are fundamentally not to be considered as true to scale; rather, for better illustrability and/or for better understanding, individual elements may be illustrated as exaggeratedly thick or greatly dimensioned.

In the present case, there is described a building platform on the basis of the figures, and also the use thereof for the additive manufacturing of a component, and a method for the manufacturing of the building platform.

FIG. 1 schematically shows a sectional or side view of a system 100 for the additive manufacturing of a component or workpiece 1.

The system 100 is advantageously a system for the additive manufacturing of the component 1 by a beam melting or beam welding method. In particular, selective laser melting, selective laser sintering, electron beam melting, laser deposition welding, in particular laser powder deposition welding, or an electron beam welding method come mind for the stated additive methods. The deposition welding method used can also be the so-called "micro cladding" which can be especially configured for a resolution of correspondingly deposited structures of less than 100 µm.

The component 1 can be a three-dimensional object which is produced or can be produced according to a predetermined or desired geometry and which, according to the additive manufacturing process, is built up by a plurality of individual layers, for example on the basis of a 3D-CAD file. An advantageous manufacturing method for the component 1 is selective laser melting.

The component 1 can be a turbine component, for example a part consisting of a nickel- or cobalt-based superalloy, said part being used in the hot gas path of a gas turbine.

In FIG. 1, the component 1 is shown as advantageously only partially and not completely produced, i.e. during its additive manufacturing.

The system 100 comprises a building platform 2 which advantageously functions as a substrate for the additive buildup of the component 1.

The building platform 2 has a surface region 3. The surface region 3 forms a surface 4 of the building platform 2. The component 1 is expediently additively built up or manufactured on the surface 4 by the stated method.

The surface region 3 advantageously has an extent or thickness D. The thickness D is advantageously at least 500 µm, particularly advantageously at least 1 mm or more.

For example, the surface region 3 can extend over the thickness of the building platform in such a way that it is thicker than a diffusion length for individual traces or elements in the building platform that can influence the material composition of the surface 4 of the surface region, in particular under the temperature conditions of the corresponding additive fabrication.

Furthermore, the surface region 3 advantageously extends over the entire lateral extent of the building platform 2.

According to the invention, the surface region 3 is additively manufactured or built up or producible in particular by means of the described additive manufacturing method. As a result, it is advantageously possible for a particularly homogeneous material composition of the building platform 2 or of the surface region 3 to be provided. For example, the entire surface 4, as viewed at least macroscopically, can be completely homogeneous or single-phase with regard to its material composition (cf. FIG. 2). Furthermore, a particle distribution of the material of the surface region can be (macroscopically) homogeneous, wherein the particle distribution has an average particle size of advantageously less than 300 µm, particularly advantageously less than 100 µm.

The stated material or surface homogeneity is advantageously inherent to the stated beam-based additive manufacturing methods, in particular additive manufacturing methods for the processing of high-performance materials for turbine blades (cf. FIG. 2). Consequently, the inventive advantages, in particular an improvement in the manufacturing result, can be achieved by virtue of the fact that the building platform according to the invention is used for the additive buildup of the component 1.

As an alternative to the described embodiment of the surface region 3, the building platform 2 can be able to be produced or can be produced completely by the above-described additive beam-based manufacturing method. In other words, the surface region 3 can extend over the entire thickness extent of the building platform 2, for example along a buildup direction of the component (not explicitly identified).

In the case of powder-bed-based additive manufacturing methods, such as selective laser melting, for example, the building platform 2 for building up in layers is, following each applied powder layer (not explicitly shown), advantageously lowered by a corresponding device (indicated by dashed lines), specifically by an extent corresponding to the layer thickness of the layer for the component that is to be newly applied and/or to be fused.

This applied layer is then advantageously melted and fused or welded by means of a beam device 6, for example by a laser beam. According to the above-described methods, the beam device 6 can in particular be configured as a laser or electron beam device for deposition welding or selective laser or electron beam melting. In the case of selective laser melting, a powder bed (not explicitly shown in the figures) is in particular scanned or followed by the beam device 6. A corresponding energy beam is indicated by the dashed line.

According to the invention, the building platform 2 is furthermore advantageously produced or can be produced by means of the above-described method in order to carry out the additive manufacturing of the component 1, as described on material which is as identical as possible in type, with the result that particularly reproducible manufacturing results can be achieved for the component 1.

In particular, this particularly reproducible material buildup is achieved by the homogeneity of the described material properties, in particular the chemical and/or physical properties of the surface region 3, in particular of its surface 4.

An alloy constituent, advantageously a main constituent of the material of the surface region 3 and of the material of the component 1, are advantageously identical or correspond. This embodiment can be achieved particularly expediently by virtue of the fact that in particular the method for the additive manufacturing of the component 1 and the additive manufacturing method by which the building platform is produced are likewise identical.

FIG. 2 schematically shows a plan view of the surface 4 of the surface region 3 of the building platform 2. The regular dotting of the surface 4 is intended to indicate that a material composition of the surface region 2 with regard to its physical and/or chemical properties is homogeneous, at least macroscopically, over the entire surface 4 (or at least distributed over large areas thereof) and advantageously has no phase transitions, but is single-phase.

Such a homogeneous surface composition of the surface 4 or of the surface region 3 of the building platform 2 is not possible in particular by means of conventional methods, in particular customarily used fine casting technology. According to the invention, this embodiment, and thus also the inventive advantages, are achieved by the use of the described additive manufacturing methods, in particular selective laser melting or else by means of laser deposition welding.

The invention is not restricted by the description on the basis of the exemplary embodiments to these embodiments but comprises any novel feature and any combination of features. This includes in particular any combination of features in the patent claims, even if this feature or this combination itself is not explicitly specified in the patent claims or exemplary embodiments.

The invention claimed is:

1. A building platform for additive manufacturing of a component from a superalloy, comprising:
    a surface region which is produced by an additive manufacturing method,
    wherein the additive manufacturing method is a beam melting or a beam welding method, and
    wherein the surface region extends from a surface of the building platform to a thickness of at least 500 pm into the building platform, and wherein the surface region is free of throuqh-openincs,
    wherein the additive manufacturing method comprises laser deposition welding or laser powder deposition welding,
    wherein the surface region comprises a particle distribution with an average particle size of less than 300 pm.

2. The building platform as claimed in claim 1,
    wherein the additive manufacturing method comprises laser or electron beam melting.

3. The building platform as claimed in claim 1,
    wherein a method for additive manufacturing of the component and the additive manufacturing method for the building platform are identical.

4. The building platform as claimed in claim 1,
    which is completely produced by the additive manufacturing method.

5. The building platform as claimed in claim 1, wherein the surface region comprises, at least macroscopically, a chemically or physically homogeneous composition.

6. The building platform as claimed in claim 1, wherein the surface region is, at least macroscopically, single-phase.

7. The building platform as claimed in claim 1, further comprising: a device for beam melting or beam welding.

8. A method for additive manufacturing of a component, comprising:
    additiovely manufacturing a building platform comprising a surface region via a beam melting or a beam welding process, wherein the surface region extends from a surface of the building platform to a thickness of at least 500 pm into the building platform, wherein the surface region is free of through-openings, and wherein the building platform is used as a substrate for the additive manufacturing of the component, and
    additively manufacturing the component on the surface region of the building platform,
    wherein the additive manufacturing method comprises laser deposition welding or laser powder deposition welding,
    wherein the surface region comprises a particle distribution with an average particle size of less than 300 pm.

9. The method as claimed in claim 8, wherein a main and/or alloy constituent of a material of the surface region corresponds with a main or alloy constituent of the component to be additively manufactured.

10. The method as claimed in claim 8, wherein the substrate is from a superalloy.

* * * * *

UNITED STATES PATENT AND TRADEMARK OFFICE
CERTIFICATE OF CORRECTION

PATENT NO. : 10,953,495 B2  
APPLICATION NO. : 16/093302  
DATED : March 23, 2021  
INVENTOR(S) : Michael Ott Page 1 of 1

It is certified that error appears in the above-identified patent and that said Letters Patent is hereby corrected as shown below:

In the Claims  
The term "500 pm" should read "500 μm" in Column 7 Line 29 of Claim 1.  
The term "throuqh-openincs" should read "through-openings" in Column 7 Line 31 of Claim 1.  
The term "300 pm" should read "300 μm" in Column 7 Line 36 of Claim 1.  
The term "additiovely" should read "additively" in Column 8 Line 17 of Claim 8.  
The term "500 pm" should read "500 μm" in Column 8 Line 21 of Claim 8.  
The term "300 pm" should read "300 μm" in Column 8 Line 31 of Claim 8.

Signed and Sealed this  
Twenty-seventh Day of July, 2021

Drew Hirshfeld  
*Performing the Functions and Duties of the*  
*Under Secretary of Commerce for Intellectual Property and*  
*Director of the United States Patent and Trademark Office*